July 29, 1952  P. S. NEWTON  2,605,133
ANTIGLARE VISOR
Filed Dec. 11, 1946

INVENTOR
PHILLIP S. NEWTON
BY his atty

Patented July 29, 1952

2,605,133

UNITED STATES PATENT OFFICE 2,605,133

ANTIGLARE VISOR

Phillip S. Newton, Oakland, Calif.

Application December 11, 1946, Serial No. 715,368

2 Claims. (Cl. 296—97)

This invention relates to light-filters employed specifically for ocular vision.

An object of the invention is to provide an anti-glare visor designed particularly as a seeing aid for the operators or other occupants of transport vehicles.

Another object of the invention is to provide a glare visor of the character described permitting direct vision through a zone producing no appreciable modification of the light rays passing therethrough or through separate defined zones, possessing varying light-modifying characteristics, at the selection of the user.

A further object of the invention is to provide a visor of the type referred to which, while providing direct unmodified vision of a defined field, will simultaneously effect a graduated filtering out of harmful or distracting light rays which may be simultaneously approaching the viewer's eye in parallel or angularly converging relation to the aforesaid direct light rays.

A still further object of the invention is to provide a glare visor which will assist the eye in overcoming the complex condition wherein the eye has naturally accommodated itself to offset glaring light approaching along a direct line of vision and is further subjected to glaring light of lesser or greater intensity approaching from a source which may be widely separated from the direct field of vision but which may lie within the field of side vision.

Still another object of the invention is to provide a glare visor comprising a sheet of light-transmitting material of minimum thickness so as to correspondingly reduce refraction, which has a central portion thereof composed of defined zones of various light-modifying characteristics and a bordering zone of uniform light-modifying characteristics all contained in the aforesaid unit sheet of material which is of uniform thickness through its entire area.

The invention possesses other objects and features of advantage, some of which, with the foregoing will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawing.

The conventional glare visor employed by operators of automobiles or the like comprises a sheet of Celluloid or similar translucent material having a uniformly dense color throughout its effective area, to suit the individual taste of the user, and through which a view, in subdued light tones, depending on the color density of the visor, may be had of the scene ahead of the vehicle. The visors of uniform color density, while they may assist vision to the degree of filtering out harmful or unwanted rays of the spectrum, produce an overall obscuring of the scene especially the bordering portions of the direct field of vision with the result that the consciousness of the vehicle operator to happenings or approaching objects in said bordering portions of the field is considerably impaired. Furthermore, although glare in the direct field of vision is somewhat lessened by the light-absorption characteristics of the visor, secondary glare originating in the bordering field is only correspondingly reduced and is proportionately as distracting as in the absence of the visor. This gives rise to a complex condition in which the eyes naturally accommodate themselves, by a contraction of the iris and by a narrowing of the slit between the eyelids, to reduce light transmission into the eyes to a comfortable level and yet are called upon to further accommodate themselves to offset the secondary glare coming from the side field.

Figure 2:
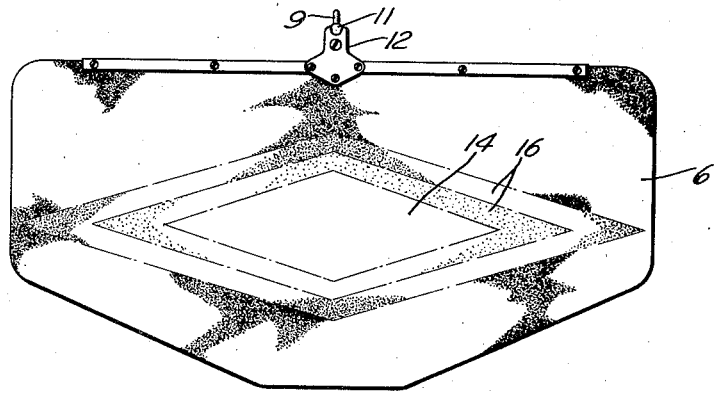
Figure 2 is a front elevational view of the glare visor showing the action of the various filter zones thereof in modifying rays of a beam of light converging on the eye of a person beyond the visor.
Figure 1:
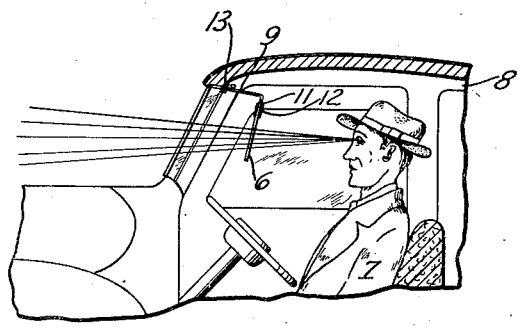
Figure 1 is a vertical sectional view of a portion of a vehicle showing the glare shield of my invention in useful position relative to the eyes of the vehicle operator.

I have provided a glare shield designed to produce direct, unmodified and comfortable vision in a horizontal plane traversing a complete field of view, and to provide in all other planes traversing the field progressively modified vision whereing rays in a cone of light being transmitted to the eye are absorbed in proportion to their distance from the cone axis so as to block or reduce to an unobjectionable minimum any high intensity rays outside of the said horizontal direct field of view. The natural reactions of the eye to glaring light projected or reflected from a direct field of view, are to constrict the iris so as to shut out light above a comfortable level and should this be insufficient to effect the aforesaid comfort, to cause squinting so that the only light permitted to reach the eye must pass through the narrow slit between the lids and also through the light modifying curtain overlying the slit and formed by the intermeshed or interengaged eyelashes. Such adjustments can become quite complicated, bothersome to the ocular system and creative of definite strains therein if the eye happens to be called upon to make further adjustment to offset glare coming from another source than the direct field of view to which the eye has accommodated itself, whether the latter source be closely bordering the field of direct vision or located in a distal or intermediate region of the field of side vision. In the glare shield of my invention I have arranged a pattern of areas possessing various light-absorbing qualities which, in effect, affords modified vision closely approximating that produced by a natural squinting of the eyes and which removes the muscular strain of such action from the eyes so that the latter may function at substantially unimpaired normal efficiency. As shown in Figure 2, I provide a pane 6 of translucent material, and of suitable geometrical shape and size as to traverse, when positioned in prescribed relationship to the eyes, a substantial cross-sectional part of the cone of light rays approaching the eyes from the combined fields of direct and side vision. The pane 6 may be constructed of translucent sheet Celluloid or material of a similar nature which will resist breakage or permanent deformity due to flexure and may further be constructed of two or more thin sheets cemented or otherwise suitably bonded together to produce a unit assembly of desired thickness as will be subsequently described. Suitable means may be provided for mounting the pane 6 before the eyes of the user, depicted in Figure 1 as the driver 7 of an automobile 8 or other vehicle, which for purposes of illustration may comprise a telescopic arm 9 provided at its ends with swivel fittings 11 secured by means of a clamp structure 12 and mounting bracket 13 to the pane and vehicle body respectively and by means of which the pane may be swingably adjusted in all planes and positioned in selectively spaced relationship with respect to and before the user's eyes so as to intersect and traverse the normal horizontal direct line of sight of the user.

I arrange the pane 6 so that various portions of the area thereof possess different light-absorbing characteristics and I prefer to arrange these areas in a particular pattern designed to produce a graduated moderation, both in horizontal and vertical planes, of successive zones of a conjugate light beam approaching the eyes. The pattern of the graduated light-modifying area may be one of several having the general form of a vertically compressed lozenge or ellipse the former of which may have straight or curved lines of demarcation between adjacent component zones depending upon the operational characteristics to be provided in the device. For purposes of illustration I have shown the pane 6 of Figure 2 provided with a central rhomboidal area 14 which I prefer to be of maximum translucency and devoid of any color or other light-modifying characteristics and which forms a central window through which unimpaired straight-ahead direct and side vision of the view under observation may be had. Bordering the upper and lower sides of the central window 14 I provide a plurality, herein illustrated as three, of distinct and separate light modifying zones 16 each of which possesses a portion of maximum width substantially equal to one half and coinciding with a line traversing the vertical width of the window 14, the sides of each zone 16 converging toward and intersecting horizontal axis of the pane adjacent the longitudinal outer corners of the window 14. The zone 16 bordering the window 14 is given a comparatively light color tint or stipple so as to produce for the absorption or stoppage of a minimized proportion of light rays contained in an incident light beam, and succeeding outwardly disposed zones 16 are provided with progressively darkened tints or condensed stippling, the outermost zone being the darker and capable of light transmission just above the minimum desired degree. The remaining area of the pane bordering the outermost zone 16 is uniformly tinted or stippled to provide transmission of light at the lowest predesigned level conducive to clear vision.

Figure 3:
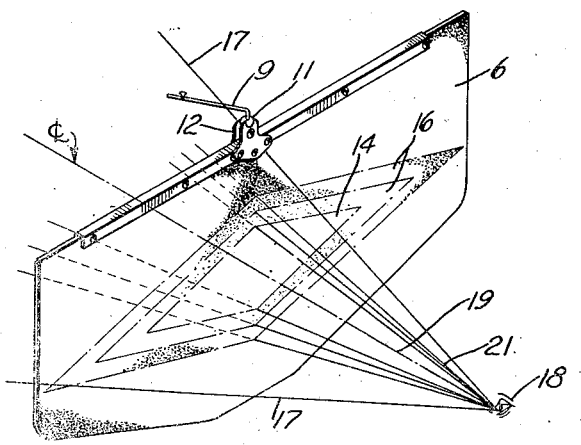
Figure 3 is a perspective view of the visor showing, in a vertical plane, the paths of light through the visor to an eye of the user.

In Figure 3 I have endeavored to illustrate how an incident beam of light 17 passing through the visor 6 is modified before it reaches the eyes 18 of the user. As the beam strikes the forward surface of the visor and penetrates the various light modifying zones only a comparatively vertically thin ray 19 of unmodified light will be permitted by the central clear window 14 to reach the user's eyes. All other rays 21 will be reduced in intensity in proportion to the densities of the zones 16 or the outer portions of the pane 6 through which they pass. In regards to the horizontal plane of the light beam, it will be seen that since all light transmission zones 14 and 16 converge in effective area toward points adjacent the opposite horizontal ends of the center window, there will be a substantially proportional absorption of rays adjacent the center of the beam and a gradually increasing absorption of the outer rays of the beam. Thus any glaring rays which happen to be approaching the eyes from the side field of vision will be substantially absorbed before they reach the eyes and cause distraction or impaired vision of the direct field of view. The effect of the vertically compressed and horizontally expanded zone pattern is thus to approximate that produced by a natural squinting of the eyes and since the latter are substantially relieved of this strain more satisfactory and comfortable vision is obtained.

Figure 4:
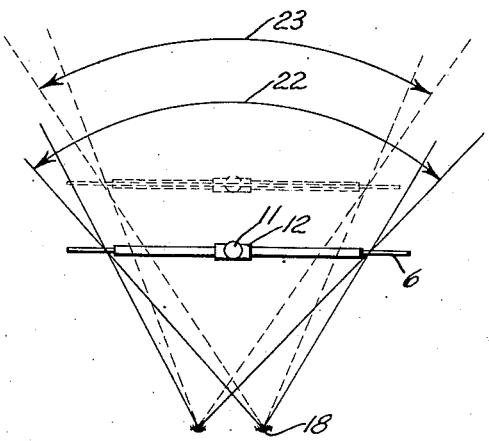
Figure 4 is a top plan view of the visor showing its operation, in differently spaced positions relative to the user's eyes, in modifying the scope of direct vision.

In Figure 4 I have illustrated, diagrammatically how the complete field of vision, indicated by the arc 22 may be compressed or expanded as desired by moving the visor to various positions spaced forwardly of the viewer's eyes 18. As shown, the dotted line positioning of the visor has compressed the field of view to the angle indicated by the arc 23 while positioning of the visor closer to the eyes than the full line position will obviously increase the angle. It follows, of course, that the vertical angularity of the sight beam will change proportionately and correspondingly with changes in the horizontal angularity depending upon the positioning of the visor.

The visor of my invention may be constructed in one of several ways. One of the simplest methods is to coat the sheet of material forming the pane 6 with a light-sensitive emulsion and to photographically reproduce from a master specimen the light transmission zones and the tonings thereof. Another method of construction is to dye or spray coat the various zones onto a base sheet which may then be in finished form or may be overlaid with a protective sheet cemented or otherwise secured thereto. Still another method is to construct the visor of a plurality of overlaid sheets each of uniform size and each containing a central single cut-out defining one of the zones 16. These sheets, having a uniform color or degree of opacity equivalent to the tone of the zone bordering the central clear window 14, when superposed, provide one, two, three or more thicknesses in succeeding zones from the center of the pane outwardly and consequently the color tone and degree of opacity are correspondingly increased in proportion to the number of thicknesses used in each zone.

It will be seen, from the above description of the preferred form of my invention, that I have provided an anti-glare visor designed to reduce bothersome glare created either by direct or reflected light approaching an observer's eyes from bordering regions of a direct field of view which tend to distract the observer's attention from the latter field and which create objectionable and tiring strain on the eyes. It will be further seen that, in accomplishing this result, I have not substantially obscured the complete visual field since the translucency of the entire pane 6 forming the effective area of the visor permits recognition of objects and movements in the field of side vision sufficiently clearly to enable the user to be consciously aware of their presence or occurrence without being greatly distracted thereby.

I claim:

1. A glare visor for interposition between an observer's eyes and a scene under observation comprising a pane of translucent material having a central substantially rhomboidally-shaped and horizontally extended area thereof possessing maximum light-transmission characteristics for passing a substantially unmodified central portion of a light beam approaching the eyes from said scene, and separate zones of said pane possessing relatively different light-transmission characteristics bordering said central area for modifying in correspondingly varying degrees separate radially distal portions of said light beam relative to said central portion of the latter, each of said zones extending along the greater portion of the periphery of its immediately adjacent zone.

2. A glare visor comprising a pane of translucent material having a central area thereof constituted to pass an unmodified part of a light beam directed thereat, a separate zone of said pane possessing different light transmission characteristics bordering and substantially enclosing said central area, said central area having its maximum vertical height at the center thereof and tapering to a minimum vertical height at the transverse ends thereof.

PHILLIP S. NEWTON.

REFERENCES CITED

The following references are of record in the file of this patent:

UNITED STATES PATENTS

| Number | Name | Date |
|---|---|---|
| 1,156,578 | Benecke | Oct. 12, 1915 |
| 1,258,107 | Geist | Mar. 5, 1918 |
| 1,437,656 | Hein | Dec. 5, 1922 |
| 1,606,094 | Myers | Nov. 9, 1926 |
| 2,050,889 | Klise | Aug. 11, 1936 |
| 2,239,158 | McCloud | Apr. 22, 1941 |

FOREIGN PATENTS

| Number | Country | Date |
|---|---|---|
| 43,650 | Denmark | Jan. 19, 1931 |